(12) United States Patent
Nakamura

(10) Patent No.: US 8,673,096 B2
(45) Date of Patent: Mar. 18, 2014

(54) METHOD OF FABRICATING PNEUMATIC TIRE

(75) Inventor: Norihiko Nakamura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1158 days.

(21) Appl. No.: 12/180,628

(22) Filed: Jul. 28, 2008

(65) Prior Publication Data
US 2009/0032174 A1 Feb. 5, 2009

(30) Foreign Application Priority Data
Aug. 1, 2007 (JP) ................. 2007-201189

(51) Int. Cl.
*B29D 30/72* (2006.01)
*B60C 13/00* (2006.01)

(52) U.S. Cl.
USPC ........ 156/123; 152/523; 152/524; 156/130.7; 156/247

(58) Field of Classification Search
USPC ............. 156/116, 123, 130.7, 247, 289; 152/524, 525
See application file for complete search history.

(56) References Cited

U.S. PATENT DOCUMENTS

| | | | |
|---|---|---|---|
| 3,285,314 A * | 11/1966 | Roberts ................... | 152/524 |
| 3,761,338 A | 9/1973 | Nakamura | |
| 4,444,713 A | 4/1984 | Egan et al. | |
| 5,058,648 A * | 10/1991 | Kansupada ............... | 152/524 |
| 5,527,407 A | 6/1996 | Gartland et al. | |
| 6,235,376 B1 * | 5/2001 | Miyazaki et al. ............ | 428/203 |
| 8,006,732 B2 | 8/2011 | Itoi | |
| 2003/0230370 A1 | 12/2003 | Stubbendieck et al. | |
| 2004/0103967 A1 | 6/2004 | Majumdar et al. | |
| 2005/0087725 A1 * | 4/2005 | Kanakkanatt ............. | 252/408.1 |
| 2005/0109440 A1 * | 5/2005 | Majumdar et al. ............ | 152/524 |
| 2006/0083940 A1 * | 4/2006 | Bekele .................... | 428/474.4 |
| 2009/0032159 A1 | 2/2009 | Nakamura | |
| 2009/0032172 A1 * | 2/2009 | Nakamura ................ | 156/110.1 |
| 2009/0032173 A1 * | 2/2009 | Nakamura ................ | 156/110.1 |

FOREIGN PATENT DOCUMENTS

| | | |
|---|---|---|
| EP | 1073031 | 1/2001 |
| JP | 63-203406 | 8/1988 |
| JP | 63-302030 | 12/1988 |
| JP | 64-016407 | 1/1989 |

(Continued)

OTHER PUBLICATIONS

Archived web pages http://www.maropolymeronline.com/Properties/modulus_values.asp (archive date Jun. 16, 2002), http://www.maropolymeronline.com/Properties/nylon_66_properties.asp (archive date Jun. 16, 2002), http://www.maropolymeronline.com/Properties/Nylon%206.asp (archive date Dec. 25, 2002); all accessed from web.archive.org on Oct. 14, 2011.

(Continued)

*Primary Examiner* — Geoffrey L Knable
(74) *Attorney, Agent, or Firm* — Fish & Richardson P.C.

(57) ABSTRACT

A smooth resin film including an ultraviolet ray absorbing agent is pasted to an outer surface of a side portion of an unvulcanized tire, the unvulcanized tire is vulcanized and molded in a state of pasting the resin film, thereby, a pneumatic tire provided with the resin film at the outer surface of the tire side portion to be able to be exfoliated therefrom is fabricated.

6 Claims, 1 Drawing Sheet

(56) References Cited

FOREIGN PATENT DOCUMENTS

| | | | |
|---|---|---|---|
| JP | 03-292205 | | 12/1991 |
| JP | 04-183768 A | * | 6/1992 |
| JP | 06-106920 | | 4/1994 |
| JP | 06-106921 | | 4/1994 |
| JP | 06-258515 | | 9/1994 |
| JP | 07-096719 | | 4/1995 |
| JP | 08-104852 | | 4/1996 |
| JP | 10-143073 | | 5/1998 |
| JP | 10-187044 | | 7/1998 |
| JP | 3061600 | | 6/1999 |
| JP | 11-207831 | | 8/1999 |
| JP | 11-286060 | | 10/1999 |
| JP | 2000-142026 | | 5/2000 |
| JP | 2002-241705 | | 8/2002 |
| JP | 2004-017964 | | 1/2004 |
| JP | 2006-143889 | | 6/2006 |
| JP | 2006-264206 | | 10/2006 |
| JP | 2007-136926 | | 6/2007 |
| KR | 10-2005-0045220 | | 5/2005 |

OTHER PUBLICATIONS

C.A. Harper, ed., Modern Plastics Handbook, ch. 1 "Thermoplastics", 2000.
Final Office Action for U.S. Appl. No. 12/180,622 dated Oct. 24, 2011.
Office Action for U.S. Appl. No. 12/180,611 dated Mar. 22, 2011.
Office Action for U.S. Appl. No. 12/180,622 dated Mar. 22, 2011.
Office Action for U.S. Appl. No. 12/180,639 dated Jul. 12, 2011.
Palmer, R.J. and updated by staff 2005, Polyamides, Plastics, Kirk-Othmer Encyclopedia of Chemical Technology, Table 1, Jan. 27, 2005.
Office Action issued Jul. 17, 2012 in JP 2007-201189.
Notification of Reasons for Refusal for Japanese Application No. 2007-201193 dated Feb. 21, 2012 with English translation.
Notification of Reasons for Refusal for Japanese Application No. 2007-201191 dated Feb. 21, 2012 with English translation.
Notification of Reasons for Refusal for Japanese Application No. 2007-201192 dated Feb. 7, 2012 with English translation.
Final Office Action for U.S. Appl. No. 12/180,611 dated Dec. 22, 2011.

* cited by examiner

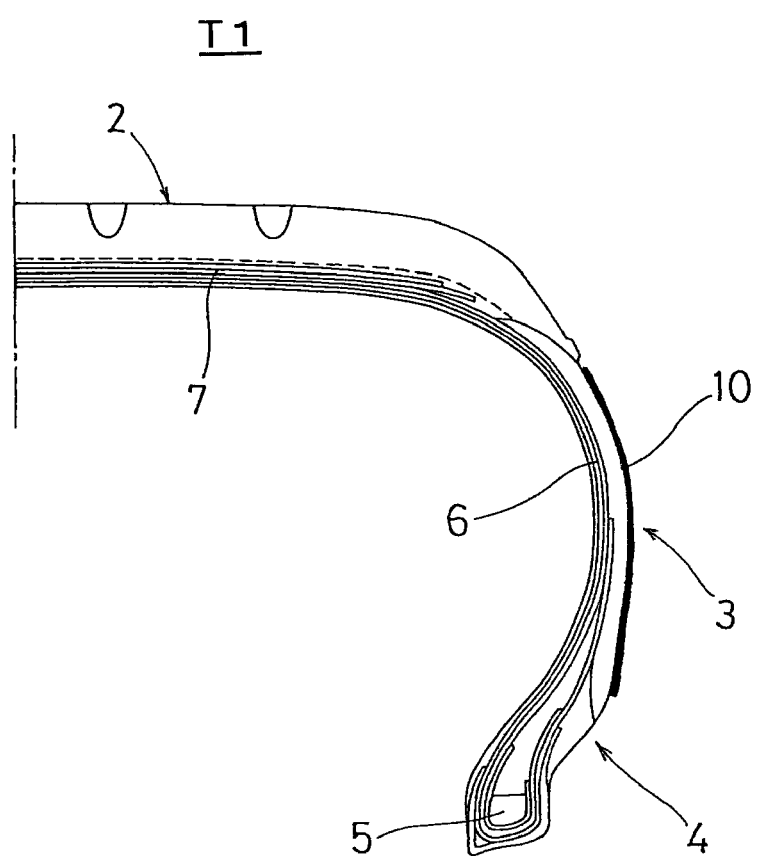

METHOD OF FABRICATING PNEUMATIC TIRE

CROSS-REFERENCE TO RELATED APPLICATIONS

This application is based upon and claims the benefit of priority from the prior Japanese Patent Application No. 2007-201189, filed on Aug. 1, 2007; the entire contents of which are incorporated herein by reference.

BACKGROUND

The present invention relates to a pneumatic tire, further in details, relates to a pneumatic tire promoting an outlook by changing reflection of light at a tire outer surface.

Generally, it is important in view of promoting a commercial value of a pneumatic tire to promote an outlook of a pneumatic tire, particularly, an outlook of a side portion and various proposals have been made in background arts.

For example, JP-A-07-096719 (KOKAI) (reference 1) proposes a pneumatic tire providing a nylon film layer on an outer side of a side wall rubber layer in order to promote an outlook of the tire as well as a weather resistance thereof. Further, JP-A-03-292205 (KOKAI) (reference 2) proposes a pneumatic tire laminating a thin film comprising polyethylene of an ultra high molecular weight on a side wall surface in order to promote an outlook while providing an ozone crack resistance.

JP-A-2000-142026 (KOKAI)(reference 3) discloses that in order to promote an outlook of a tire by promoting a glossiness of a surface of a molded tire, a surface of a mold is formed by shooting beads of a predetermined particle size and a tire surface a surface roughness (Ra) of which falls in a range of 1.5 through 20 μm is molded by using the mold. Further, US 2003/0230370 A1 (reference 4) discloses that in order to provide a light reflecting face along an outer surface of a tire, a side wall portion of the tire is molded by using a mold having an average surface roughness less than 0.381 μm.

Although according to technologies disclosed in references 3 and 4 mentioned above, the glossiness of the tire side portion is promoted by rectifying the roughness of the mold surface, the mold surface is adhered with a substance bloomed from inside of rubber constituting a tire main body in vulcanizing and molding the tire and is stained thereby. Therefore, there poses a problem that the outlook is deteriorated by transcribing the stain onto the surface of the side portion.

On the other hand, according to technologies disclosed in references 1 and 2 mentioned above, the resin film is provided at the outer surface of the tire side portion. However, the film is to be completely adhered to the tire main body, that is, the film constitutes a portion of the tire outer surface in using the tire, thereby, the weather resistance and the ozone crack resistance are promoted. Therefore, for example, according to reference 1, in order to firmly adhere the nylon film layer to the side wall rubber layer, the nylon film is subjected to a pretreatment of adherence of RFL (resorcinol formaldehyde latex) treatment or the like. Therefore, the technologies do not intend to provide the resin film on the tire outer surface to be able to be exfoliated therefrom.

Meanwhile, according to a pneumatic tire, there is a case in which a long period of time is taken after fabrication thereof until delivery to an end user. In such a case, in storage or in exhibition at a shop front thereof, it is necessary to prevent a commercial value from being deteriorated by ensuring weather resistance. With regard to the weather resistance, JP-A-2006-143889 (KOKAI) proposes to blend benzoate species and/or triazine species ultraviolet ray absorbing agent in a rubber composition for a tire along with diamine species antiaging agent in order to beautifully maintaining an outlook of the tire over a long period of time. However, the reference only discloses that the rubber per se constituting the tire main body is blended with the ultraviolet ray absorbing agent at a tire side portion or a tread portion.

SUMMARY

The invention has been carried out in view of the above-described point and it is an object thereof to provide a pneumatic tire capable of promoting an outlook by promoting a glossiness of a tire side portion and also promoting a weather resistance.

According to the invention, there is provided a method of fabricating a pneumatic tire, including pasting a smooth resin film including an ultraviolet ray absorbing agent to an outer surface of a side portion of an unvulcanized tire, and vulcanizing and molding the unvulcanized tire in the state of pasting the resin film, whereby the resin film is provided at the outer surface of the tire side portion to be able to be exfoliated therefrom.

The resin film can be exfoliated from a tire main body before being used as a tire, a surface roughness at a portion pasted therewith is small, and therefore, a reflectance of light is promoted. Therefore, a glossiness is improved, and the tire side portion is provided with a shining surface, and therefore, an outlook of the tire can be promoted. Further, when the resin film is exfoliated at a stage of delivering a commercial product to an end user, also adherence of a defect or a stain in transporting the tire can be prevented.

Further, even when left for a long period of time after fabrication until delivery to an end user, a deterioration of rubber is restrained and a weather resistance thereof can be promoted by an effect of the ultraviolet ray absorbing agent provided to the resin film.

BRIEF DESCRIPTION OF THE DRAWINGS

FIG. 1 is a half sectional view of a pneumatic tire according to an embodiment of the invention.

DETAILED DESCRIPTION

Articles related to an embodiment of the invention will be explained in details as follows.

A resin film used in the invention is a smooth film including an ultraviolet ray absorbing agent. A film including an ultraviolet ray absorbing agent may be a resin film fabricated by kneading an ultraviolet ray absorbing agent to a resin constituting a film, or/and, a skin film including an ultraviolet ray absorbing agent may be formed on a film surface by treating a previously fabricated resin film by dipping the resin film in a liquid including an ultraviolet ray absorbing agent or coating the liquid thereon.

Although the ultraviolet ray absorbing agent is not particularly limited, and examples thereof include benzotriazoles such as 2-(2'-hydroxy-5'-methylphenyl)benzotriazole, 2-[2-hydroxy-3-(3,4,5,6-tetrahydroxyphthalimidemethyl)-5-methylphenyl]benzotriazole, 2-(3-t-butyl-2-hydroxy-5-methylphenyl)-5-chlorobenzotriazole, 2-(2-hydroxy-5-t-octylphenyl)benzotriazole, and 2-(2'-hydroxy-3',5'-di-t-pentylphenyl)benzotriazole; triazines such as 2,4-di-t-butylphenyl-1,3,5-triazine-2-yl)-5-[(hexyl)oxy]-phenol;

benzoates such as 2,4-di-t-butylphenyl-3,5-di-t-butyl-4-hydroxybenzoate; benzophenones such as 2-hydroxy-4-n-octaoxybenzophenone; and salicylic acid derivatives such as phenylsalicylate and p-butylphenylsalicylate.

It is preferable for the resin film that (a) melting point is equal to or higher than 230° C., (b) thickness is 10 through 150 μm, and (c) arithmetic average surface roughness (Ra) is equal to or less than 0.1 μm.

With regard to (a), when the melting point of the film is lower than 230° C., the film is inferior in a heat resistance in vulcanizing a tire and a glossiness of a tire surface from which the film is exfoliated is deteriorated by shrinking of the film or the like. It is further preferable that the melting point of the film is equal to or higher than 250° C. Although an upper limit of the melting point of the film is not particularly limited, the higher the melting point the more preferable, normally, the upper limit is equal to or lower than 350° C. Here, the melting point is a value measured in conformity with DSC (differential scanning calorimeter) of JIS K7121.

As a resin film having such a melting point, polyester resin film of, for example, polyethylene terephthalate (PET) film, polybutylene terephthalate (PBT) film, polyethylene naphthalate (PEN) film or the like, fluorocarbon resin film or the like are preferably pointed out.

With regard to (b), when the thickness of the film is less than 10 μm, the film is liable to be wrinkled when pasted on an unvulcanized tire outer surface, the operability is deteriorated and the glossiness of the tire surface after having been exfoliated is deteriorated by the wrinkle. When the thickness of film is thick to exceed 150 μm, a performance of following to the rubber surface in vulcanizing and molding is poor and is inferior in the operability. The thickness of the film is further preferably 20 through 120 μm. Here, the thickness of film is a value measured in conformity with JIS C2151.

With regard to (c), by using a resin film having an arithmetic average surface roughness (Ra) equal to or smaller than 0.1 μm, the glossiness of the tire surface after having been exfoliated therewith can remarkably be promoted, and an excellent outlook shining in black color can be provided. Here, the arithmetic average surface roughness (Ra) is an arithmetic average roughness of a degree of recesses and projections of a surface per unit length measured in conformity with a standard of JIS B0601 (stylus type surface roughness measuring instrument) by using a stylus type surface roughness meter.

The resin film is provided at the outer surface of the tire side portion to be able to be exfoliated therefrom by pasting the resin film on the unvulcanized tire outer surface and vulcanizing and molding the unvulcanized tire under the state. In details, the resin film cut in a predetermined shape is pasted to a predetermined position at an outer surface of a side portion (that is, side wall portion) of a tire before being vulcanized (that is, green tire). Further, in the state of pasting the resin film, the unvulcanized tire is vulcanized and molded at inside of a tire vulcanizing mold. Thereby, a pneumatic tire provided with the resin film at the outer surface of the side portion to be able to be exfoliated therefrom is fabricated.

The resin film is provided with a smooth surface, and therefore, can maintain an adherence excellently with the surface of the unvulcanized tire having a viscosity and a positional shift of the resin film in being vulcanized can be prevented. When the surface roughness of the resin film differs by two head and tail faces, a surface on a side having the arithmetic average surface roughness (Ra) equal to or smaller than 0.1 μm is pasted onto the surface of the unvulcanized tire.

Pasting of the resin film to the unvulcanized tire may be carried out for the unvulcanized tire before setting the unvulcanized tire to the vulcanizing mold, or/and, the resin film may be set to a predetermined position of the vulcanizing mold and the resin film may be pasted onto the unvulcanized tire by closing the mold at inside of the vulcanizing mold. Preferably, the resin film is pasted to the unvulcanized tire before being set to the vulcanizing mold as in the former.

Vulcanizing and molding per se of the unvulcanized tire can be carried out in accordance with a normal method and also a structure of the vulcanizing mold is not particularly limited. Although a vulcanizing temperature is not particularly limited, normally, vulcanizing is carried out at 160 through 200° C.

According to the pneumatic tire provided in this way, the resin film is provided at the outer surface of the side portion to be able to be exfoliated therefrom. That is, the resin film is pasted thereto without interposing an adhering agent or the like between the resin film and the tire surface to be able to be exfoliated therefrom from the tire main body after vulcanizing and molding.

Further, the smooth surface of the pasted resin film is transcribed onto the outer surface of the tire substantially by the same surface roughness (Ra), and therefore, the tire surface after exfoliating the resin film is provided with an extremely smooth arithmetic average surface roughness (Ra) similar to that of the resin film, preferably, equal to or smaller than 0.1 μm. Therefore, the high glossiness can be achieved by promoting reflectance of light at the tire side portion and an excellent outlook shining in black color can be provided.

Although the resin film is subjected to use of a tire by being exfoliated therefrom, a timing of exfoliation is preferably at a stage of providing a tire to an end user. By making the resin film stay to be pasted also in storage or transportation after fabricating the tire in this way, a defect or a stain in the storage or the transportation can be prevented from being adhered thereto. Further, even when left for a long period of time until delivery to an end user, by an effect of an ultraviolet ray absorbing agent provided to the resin film, rubber is restrained from being deteriorated, and the weather resistance can be promoted. Further, a deterioration by oxidizing rubber in storage can also be prevented by blocking air from the tire by the resin film.

FIG. 1 is a half sectional view of a pneumatic tire T1 according to the embodiment of the invention. The tire T1 is constituted by a tread portion 2, a pair of left and right side portions 3 extended to an inner side in a tire radius direction from both end of the tread portion 2, and a pair of left and right bead portions 4 continuous to inner ends of the side portions 3 and fixedly attached to a rim flange. In this example, there is shown a radial tire for a passenger vehicle having a radial structure carcass 6 in which a carcass ply end is folded back to around a bead core 5 to be locked thereto, and a belt layer 7 arranged at an outer periphery of the tread portion 2 of the carcass 6.

An outer surface of the side portion 3 of the tire T1 is provided with the resin film 10 to be able to be exfoliated therefrom. In this example, the resin film 10 is provided in a ring-like shape over an entire periphery in a peripheral direction of the tire at substantially a total in a height direction of the side portion 3.

Further, the outer surface of the side portion 3 of the tire T1 is generally provided with a mark (not illustrated) constituted by character, numeral, sign indicating maker name, brand name, tire size or the like, or diagram of tire rotating direction or the like.

By providing the resin film 10 over a wide range of a total of the side portion 3 in this way, an area of a rubber surface portion having a high glossiness after exfoliating the film is enlarged, an effect of promoting an outlook is excellent and an effect of promoting a weather resistance is provided by a wide area.

Further, a portion of pasting the resin film is not particularly limited in a range or a size, a position thereof so far as the portion is at the tire side portion and, for example, may be provided at a portion in a tire peripheral direction of the side portion. Further, the film may be provided in a ring-like shape over an entire periphery in a tire peripheral direction in a comparatively narrow range in a height direction of the side portion. Further, a resin film cut along a contour of a mark may be pasted such that the mark is formed as a mirror face by pasting the resin film.

EXAMPLES

Although examples of the invention will be shown as follows, the invention is not limited to the examples.

As a rubber composition for a side wall, there was prepared a rubber composition by kneading by a normal method by using a Banbury mixer of a capacity of 200 L by a blending prescription constituted by 50 weight parts of natural rubber (RSS#3), butadiene rubber (made by UBE INDUSTRIES, LTD. 'UBEPOL-BR150B') 50 weight parts, carbon black FEF (made by Tokai Carbon Co., Ltd. 'SEAST SO') 60 weight parts, aroma oil (made by JAPAN ENERGY CORPORATION 'X-140') 10 weight parts, paraffin wax (NIPPON SEIRO CO., LTD. 'Ozoace-0355') 2 weight parts, antiaging agent 6C (made by OUCHI SHINKO CHEMICAL INDUSTRIAL CO., LTD. 'NOCRAC 6C') 2 weight parts, stearic acid (made by KAO CORPORATION 'LUNAC S-20') 2 weight parts, zinc oxide (made by MITSUI MINNING & SMELTING CO., LTD. 'zinc white No.1') 3 weight parts, sulfur (made by Hosoi Chemical Industry Co., Ltd. '5% oil treat powder sulfur') 2 weight parts, vulcanization promoter NS (made by OUCHI SHINKO CHEMICAL INDUSTRIAL CO., LTD. 'NOCCELER NS-P') 1.5 weight parts.

A pneumatic radial tire (size: 215/60R16) applied with the provided rubber composition at a side portion was trially fabricated. At that occasion, a thermoplastic resin film described in Table 1 shown below was cut by a predetermined size, the film was pasted to an outer surface of a side portion of an unvulcanized tire as shown by FIG. 1, set to a tire mold made of steel in a pasted state, and respective trial tires were vulcanized and molded under a vulcanizing condition of 170° C.×20 minutes. The resin films used in Examples 1 through 3 are resin films kneaded with the ultraviolet ray absorbing agent, and the resin film used in Example 4 is the resin film providing the ultraviolet ray absorbing agent to a film surface by dipping.

Surface roughnesses of the respective films were measured by a method shown below. Further, with regard to the provided respective trial tires, an operability was evaluated, and a glossiness of a rubber surface after exfoliating the resin film was measured. Further, weather resistance was evaluated for test samples in correspondence with the respective trial tires. Measuring or evaluating methods are respectively as follows.

[Surface Roughness]

An arithmetic average surface roughness (Ra) of the resin film is measured by using a stylus type surface roughness meter 'E-35A' made by TOKYO SEIMITSU CO., LTD.

Occurrence of wrinkle in pasting the resin film, a finish result of vulcanized tire (particularly, portion of pasting resin film), breakage, easiness of exfoliation or the like in exfoliating the resin film are evaluated, and evaluated as 'o' in a case without problem and by 'x' in a case with problem.

[glossiness]

60° glossiness of rubber surface after having been exfoliated therewith at the resin film pasting portion of the trial tire is measured in conformity with a method of JIS Z8741 by using a gloss meter 'VG2000' made by Nippon Denshoku Industries Co., Ltd. Measurement is carried out at 5 portions in a tire peripheral direction and an average value thereof is calculated. The larger the value the better the glossiness.

[Weather Resistance]

The resin film described in Table 1 shown below is pasted to a rubber unvulcanized sheet comprising the rubber composition to vulcanize (170° C.×20 minutes) and the provided sample is irradiated with an ultraviolet ray of a fluorescent lamp for 24 hours from a side of pasting the resin film (in conformity with JIS K6266). Thereafter, a tensile test (in conformity with JIS K6251) is carried out after exfoliating the resin film and a change in a rupture elongation before and after irradiating the ultraviolet ray is indicated by an index constituting 100 by Comparative Example 1. The larger the index, the smaller the change in the rupture elongation and the more excellent in the weather resistance.

TABLE 1

| | | resin film | | | | | | | |
|---|---|---|---|---|---|---|---|---|---|
| | kind | ultraviolet ray absorbing agent | commercial name-maker | melting point (° C.) | thickness (μm) | surface roughness Ra (μm) | operability | glossiness | weather resistance |
| Example 1 | PET | present | Teijin-made Tetoron HB | 260 | 25 | 0.05 | o | 60 | 108 |
| Example 2 | PET | present | Teijin-made Tetoron HB | 260 | 100 | 0.05 | o | 64 | 125 |
| Example 3 | PET | present | Teijin-made Tetoron HB | 260 | 50 | 0.05 | o | 62 | 115 |
| Example 4 | PET | present | Tochisen-made T-UV | 260 | 50 | 0.05 | o | 60 | 110 |
| Comparative Example 1 | PET | not present | Teijin-made Tetoron S | 260 | 100 | 0.05 | o | 63 | 100 |
| Comparative Example 2 | PET | not present | Teijin-made Tetoron S | 260 | 188 | 0.05 | x | 65 | 100 |
| Comparative Example 3 | nylon 6 | not present | Toyo Boseki Harden N1100 | 220 | 25 | 0.03 | x | 20 | 100 |

The result is as shown by Table 1, and in cases of Examples 1 through 4, a rubber surface having a very small surface roughness can be formed without deteriorating an operability, and therefore, a side portion providing a high glossiness and having an excellent outlook shining in black color can be formed. Further, the resin films of Examples 1 through 4 include the ultraviolet ray absorbing agent, and therefore, a deterioration of rubber was restrained and the weather resistance was excellent.

Further, in Comparative Example 2, although the thickness of the resin film was large, even when the thickness was increased, an effect was not brought about in the weather resistance, conversely, by being excessively thick, a performance of following to the rubber surface was deteriorated, a problem was posed in the finish result after the vulcanization, and operability was poor. Further, in Comparative Example 3 using a nylon film having a low melting point, wrinkle was brought about in vulcanizing a tire and a glossiness was inferior.

What is claimed is:

1. A method of fabricating a pneumatic tire, comprising pasting a smooth resin film including an ultraviolet ray absorbing agent to an outer surface of a side portion of an unvulcanized tire, the outer surface being black in color, and vulcanizing and molding the unvulcanized tire in the state of pasting the resin film, whereby the resin film is provided at the outer surface of the tire side portion to be able to be exfoliated therefrom, wherein the resin film is provided directly, without interposition of an adhering agent, in a ring-like shape over an entire periphery in a tire peripheral direction at substantially a total in a height direction of the tire side portion, and a melting point of the resin film is equal to or higher than 230° C., a thickness thereof is 10 through 150µm, and an arithmetic average surface roughness (Ra) thereof is equal to or smaller than 0.1µm, further comprising exfoliating the resin, film, and wherein the outer surface of the side portion after exfoliating the resin film has an arithmetic average surface roughness (Ra) equal to or smaller than 0.1µm and has a 60° glossiness of 60-64.

2. The method of fabricating a pneumatic tire according to Claim 1, wherein the resin film is a polyester resin film.

3. The method of fabricating a pneumatic tire according to Claim 1, comprising a step of forming a film including an ultraviolet ray absorbing agent on a surface of a resin film to obtain the resin film including the ultraviolet ray absorbing agent.

4. The method of fabricating a pneumatic tire according to Claim 1, wherein the resin film is applied to the outer surface of the side portion of the unvulcanized tire, and then the unvulcanized tire is set to a vulcanizing mold.

5. The method of fabricating a pneumatic tire according to Claim 1, wherein the resin film is set to a predetermined position of a vulcanizing mold, and then the resin film is applied to the unvulcanized tire at inside of the vulcanizing mold by closing the mold.

6. The method of fabricating a pneumatic tire according to Claim 1, wherein the resin film is exfoliated at a stage of providing the tire to an end user.

* * * * *

UNITED STATES PATENT AND TRADEMARK OFFICE
CERTIFICATE OF CORRECTION

PATENT NO. : 8,673,096 B2  
APPLICATION NO. : 12/180628  
DATED : March 18, 2014  
INVENTOR(S) : Norihiko Nakamura Page 1 of 1

It is certified that error appears in the above-identified patent and that said Letters Patent is hereby corrected as shown below:

In the Claims:

Column 8, Line 5, Claim 1, delete "resin, film," and insert --resin film,--;

Column 8, Line 11, Claim 2, delete "Claim I," and insert --Claim 1,--.

Signed and Sealed this
Tenth Day of June, 2014

Michelle K. Lee
*Deputy Director of the United States Patent and Trademark Office*